Sept. 6, 1938.　　　　C. G. GASE　　　　2,129,418
MILLING TOOL
Filed Sept. 21, 1936　　　2 Sheets-Sheet 1
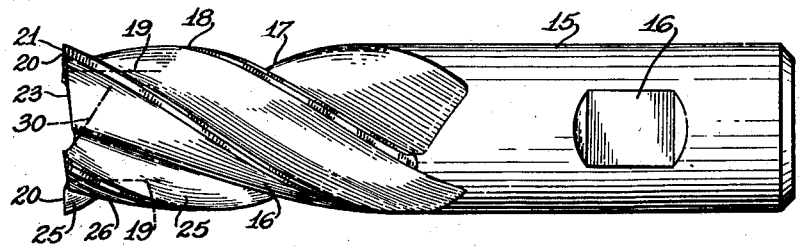
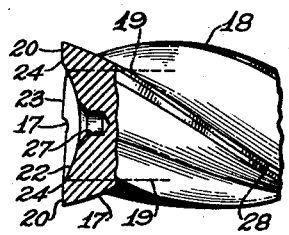
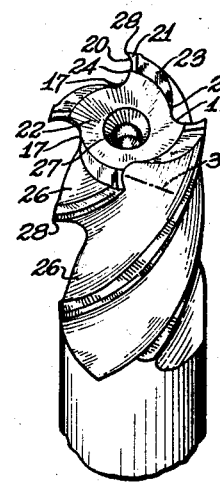
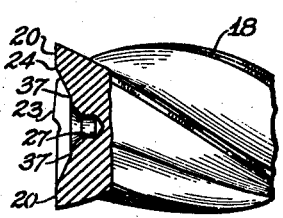
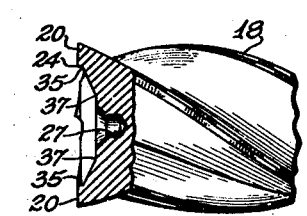
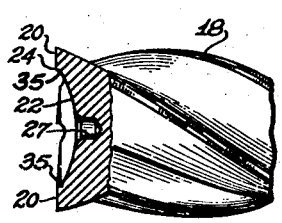
INVENTOR.
CARL G. GASE.
BY Woodling and Kroet.
ATTORNEY.

Sept. 6, 1938.  C. G. GASE  2,129,418
MILLING TOOL
Filed Sept. 21, 1936  2 Sheets-Sheet 2

INVENTOR.
CARL G. GASE.
BY Hoodling and Krost.
ATTORNEY.

Patented Sept. 6, 1938

2,129,418

UNITED STATES PATENT OFFICE 2,129,418

MILLING TOOL

Carl G. Gase, Parma, Ohio, assignor to Weldon Tool Company, Cleveland, Ohio, a corporation of Ohio Application September 21, 1936, Serial No. 101,769

6 Claims. (Cl. 29—103)

My invention relates generally to milling tools and more particularly to end mills and the like, and other tools having a cutting end, and the process for making the same.

An object of my invention is to provide an end mill having a cutting end constructed so that the severed shavings and chips will not clog in the cutting end, but will move up the flutes of the end mill.

Another object of my invention is to provide an end mill having cutting edges on the end thereof, and having a depressed portion extending across the end of the end mill intermediate the cutting edges.

Another object is to provide an end mill having a body portion and a plurality of fillets extending therefrom and forming flutes therebetween, and having a depressed end portion extending across the end of the mill with the minimum boundary points of the depressed end portion terminating at the valley of the flutes and with the maximum boundary points of the depressed end portion terminating at the inner edge of the cutting edges upon the end of the fillets.

Another object is to provide an end mill having a body portion and a plurality of fillets extending therefrom and forming flutes therebetween, and having a depressed end portion extending across the end of the mill, the said depressed portion beginning at the inner end of the cutting edges having a relatively small depth and from which depth the surface gradually deepens as it moves inwardly.

Another object is to provide an end mill having a body portion and a plurality of fillets extending therefrom and forming flutes therebetween, and having a depressed end portion extending across the end of the mill, said depressed portion extending inwardly in a straight slope from the terminus of the valley of each said flute.

Another object is to provide an end mill having a body portion and a plurality of fillets extending therefrom and forming flutes therebetween, and having a depressed end portion extending across the end of the mill, said depressed portion extending inwardly in an arcuate slope from the terminus of the valley of each said flute.

Another object of my invention is the provision of an end mill having a body portion and a plurality of fillets extending therefrom and forming flutes therebetween so that the valley of the flutes constitutes a part of the outer surface of the body portion, and having cutting edges on the end of each fillet with a clearing surface extending from the cutting edges being confined to each fillet and being wholly without the body portion of the mill.

Another object of my invention is the provision of an end mill having a body portion and a plurality of fillets extending therefrom and forming flutes therebetween, so that the valley of the flutes constitutes a part of the outer surface of the body portion, and having cutting edges on the end of each fillet with a clearing surface extending from each cutting edge to a point which lies at a circumferential distance from the next adjacent cutting edge and terminating at the boundary of a depressed portion which extends across and lies intermediate the cutting edges of the fillets.

Another object of my invention is the provision of an end mill having a body portion and a plurality of fillets extending therefrom and forming flutes therebetween along the body portion to substantially the most forward part of the body portion at the cutting end so that the said valley of each flute affords a surface upon which the severed mass is carried and directed along the flutes away from the cutting end to prevent the severed mass from working inwardly under the cutting end of the mill.

A further object is to provide an end mill having fillets with an undercut side and a cutting edge having the outline of the contour of the undercut side at the end of each fillet.

Another object is to provide an end mill having a clearance surface extending from each cutting edge to a point at a circumferential distance from the next adjacent cutting edge.

Another object is to provide an end mill having no chip space at the terminus of each flute so that the chips and shavings do not work inwardly of the body portion of the end mill but are carried off up along the longitudinal flute of the mill.

Another object of my invention is the provision of an end mill which cuts at a relatively high feeding speed without burning the cutting end.

Another object of my invention is the provision of an end mill which cuts at a relatively high feeding speed without causing the chips or severed mass to clog the cutting end.

A further object is to provide an end mill having a cutting edge arcuate in shape.

A still further object is to provide a process for forming the cutting end of an end mill.

Other objects and a fuller understanding may be had by referring to the following description and claims taken in conjunction with the accompanying drawings, in which:

Figure 1 represents a side view of my end mill;

Figure 2 represents a left-hand end view looking at the cutting end of the end mill in Figure 1;

Figure 3 is a perspective view of my end mill looking at the left-hand end of the end mill shown in Figure 1;

Figure 4 represents a view of my end mill with portions of the cutting end cut away to give a fragmentary view of the cutting end, and particularly the depressed portion at the end of the mill;

Figure 5 represents a view similar to Figure 4 and shows a modification of the depressed portion at the end of the mill;

Figure 6 is also similar to Figure 4 and represents another modification of the depressed portion at the end of the mill;

Figure 7 is also similar to Figure 4 and represents still another modification of the depressed portion at the end of the mill;

Figure 8 is similar to Figure 3, but shows the mill with a depressed portion at the end as shown in Figure 6;

Figure 9:
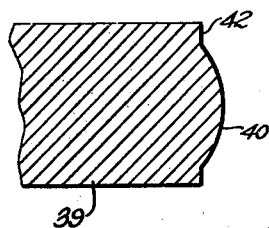
Figure 9 represents a fragmentary view of the forming tool used for forming the depressed portion in the end of my end mill.

Referring to Figure 1, I show an end mill 15 having a flat surface 16 to facilitate the holding of the end mill 15 in a milling machine. The end mill 15 comprises a body portion or core 19 and a plurality of fillets 18 extending therefrom and forming flutes 17 between the fillets, the valley of the flutes constituting a part of the outer surface of the body portion. The entire body portion is cylindrical and has a diameter equal to the root diameter of the fillets 18, that is, the distance between the diametrically opposed flute valleys 17 and is indicated in Figure 1 as the portion lying between the two parallel dotted lines.

For the purpose of clarity, the term "outwardly" is used herein to express the direction radially out, or away from the center of the mill as shown in Figure 2. The term "inwardly" is used herein to express the direction radially in toward the center of the mill as shown in Figure 2. The term "forwardly" is used herein to express the longitudinal direction toward the cutting end on the left hand end of the mill shown in Figure 1. The term "rearwardly" is used herein to express the longitudinal direction toward the engaging portion on the right hand end of the mill shown in Figure 1.

As shown in the illustration, the fillets 18 are integral with the end mill and are extended in a spiral manner along the mill. Each fillet 18 has a narrow or undercut side 25 and a wider side 26 which converge to form a longitudinal edge 28 extending along each of said fillets. The contour of the undercut side 25 is arcuate so that the undercut side 25 extends outwardly from the flute valley 17 in a curve to the longitudinal edge 28. Upon the cutting end of each fillet is a cutting edge 20 extending inwardly toward the axial center of the end mill. It is seen in Figure 2 that the cutting edge 20 is arcuate in shape following the contour of the undercut side 25.

The construction of the cutting end of my end mill is best seen by referring to Figures 2 and 3. The dead center hole 27 is the conventional hole formed in the axial center of the mill for use in handling and forming the mill. Extending across the cutting end of the body portion of the mill between the flute valleys 17 and outwardly on the ends of the fillets 18 up to the inner terminus 24 of each cutting edge 20 is an arcuate depressed portion 22. It is seen in Figure 2 that the depressed portion 22 has minimum boundary points terminating at the circumference of the body portion 19 or at the valley of the flutes 17 and has maximum boundary points terminating at the inner end of the cutting edges upon the ends of the fillets 18.

The cutting clearances 21 extend in a slightly sloping or receding manner from the cutting edges 20. The flute clearances 23 extend rearwardly from each cutting clearance 21 with a greater receding slope and also with an incline slightly outwardly, so as to converge with the wider side 26 of each fillet. The clearance surface extends toward the next adjacent cutting edge but terminates at point 29 which lies at a circumferential distance from the next adjacent cutting edge and which lies on the boundary of the depressed portion 22. The line between the clearance surface 23 and the depressed portion 22 is spoken of as the clearance-depressed portion line, and the line separating the clearance surface 23 and the wider side 26 of each fillet is spoken of as the clearance-wider side line. The clearance surface is in the form of an arcuate triangle having the cutting edge 20 as its base and having the clearance-depressed portion line and the clearance-wide side line as the two sides converging to form the apex of the arcuate triangle at a point 29. It is to be noted that point 29 approaches the bottom of the flute valley 17 but does not substantially extend thereto so that the clearance surface does not extend inwardly of the body portion but is confined to the ends of the fillets.

Figure 4 showing a fragmentary view of the cutting end of my end mill, illustrates the position of the relative parts of the cutting end. The cutting edges 20 are confined to the ends of the fillets and do not extend into the body portion 19, and the maximum base of the depressed portion 22 extends across the end mill between the inner terminus 24 of each cutting edge 20.

It is seen in Figure 4 that there is no longitudinal rearward cut or chip space in the body portion 19 at the terminus of each flute as found in conventional end mills, but that the flute valley meets the edge of the depressed portion 22 at the terminus of each flute valley, so that the chips and shavings do not clog in the end of the mill and do not work inwardly toward the center of the end mill. In the conventional end mill, the chip pockets or chip spaces cause chips or shavings to lodge and to clog in the cutting end of the mill or to work inwardly and prevent the proper cutting action of the mill. The construction of the cutting end of my mill is such that the conventional chip pocket is eliminated and clogging and inward movement of the chips are minimized. In speaking of chips or shavings, I am referring to the severed material severed from the mass upon which the end mill is operating.

The construction of my end mill may be explained with reference to a dotted line 30, see Figures 1, 3, and 8, which represents a line lying on a plane passing through the end of the end mill at a perpendicular to the tangent of the spirally disposed undercut side 25 at the forward terminus of the undercut side. Each flute valley extends to or forwardly of the perpendicular line 30. In other words, the flutes are extended along the body portion to a point which lies upon or to a point which is forwardly of the perpendicular line 30. As the cutting action forces the chips and shavings cut by the cutting edge 20 in a direction perpendicular to the undercut side, they are disposed in the first instance to follow the direction of line 30. It is seen that the sides of the fillets and the flute valleys are continuous along or in the neighborhood of this line and there is no inward escape at the terminus of the flute for the chips and shavings. Therefore, the chips and shavings are forced and directed along the line 30 to where they hit the wider side 26 of the next adjacent fillet and then they are directed up the flute away from the cutting end. In this manner the chips and shavings are rapidly carried away from the cutting end and are prevented from clogging the work or "burning" at the cutting edges.

The depressed portion at the cutting end of my end mill may be of several forms. In the form shown in Figures 1 to 4 inclusive, the depressed portion 22 is arcuate, and slopes inwardly with the minimum boundary points commencing at the terminus of each flute and the maximum boundary points commencing at the inner terminii of the cutting edges. In Figure 5, I show a modified form of the base of my depressed portion, in that, instead of being arcuate in form, the sides extend in a straight line to point 37 and then straight across and laterally of the body portion to the dead center hole 27.

In Figure 6, I show still another modification of my end mill having a slightly different depressed portion in its end. In this modification, there is a slight longitudinal cut into the fillet at the inner terminus 24 of each cutting edge so that the depressed portion on the fillet has a straight wall longitudinally of the end mill from point 24 to point 35. This straight wall is very shallow and is only upon the fillets and not upon the body portion. The arcuate depressed portion 22 extends inwardly on an arcuate slope from point 35 on the fillets. The arcuate depressed portion commences sloping inwardly immediately without any preliminary longitudinal cut at the terminus of each flute on the body portion.

The nature of the straight wall from point 24 to 35 is better illustrated in Figure 8 which is a perspective view of the end of my end mill with a depressed portion similar to that shown in Figure 6. It is seen that the arcuate depressed portion 22 extends across the end of the body portion 19 between the flute valleys 17, and outwardly on the fillets to points 35 on the longitudinal wall thereon.

Figure 7 is still another modification of my end mill with a varied form of depressed portion upon the cutting end. In this modification, there is a slight longitudinal cut from point 24 to 35 upon the ends of the fillets as in the modification shown in Figure 6. The sloping walls of the depressed portions extending inwardly from point 35 to 37 is however, straight, as in the modification in Figure 5. This inward cut from point 24 to 35 also is confined to the ends of the fillets, the straight slope 35 to 37 commencing immediately at the edge of the body portion at the terminus of each flute just as is illustrated in Figures 3 and 8. The inward longitudinal cut 24 to 35 is very slight in dimension so that the slope from 35 to 37 commences inwardly immediately at the terminus of each flute valley.

The sloping walls of the depressed portion on the end of my end mill acts as a brace and support for the cutting edges and clearance surfaces upon the ends of the fillets. The structure of the depressed portion is also such that chips and shavings cut from the mass being cut do not have a place in which to catch at the cutting end of the mill and do not clog or retard the cutting action. The depressed portion is symmetrical and there is no pocket on the end of the body portion for the chips or shavings to lodge in or to work through toward the axial center of the body portion. As the clearance surfaces do not substantially intrude upon the bottom of the flute valleys, the sloping walls of the depressed portion extend right up to the terminii of the flutes and thereby present a wall against inward working of the chips and shavings.

Figure 10:
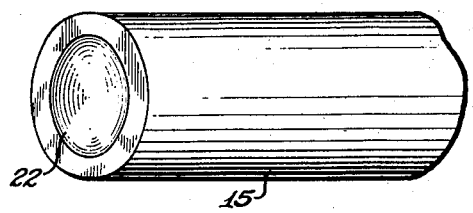
Figure 10 represents a blank form of my end mill with the depressed portion formed therein by the forming tool shown in Figure 9.

My invention also includes the process for forming the cutting end of my end mill. In Figures 9 and 10, I illustrate the method of forming the arcuate depressed portion 22 in the end of a blank for my end mill 15, by means of the forming tool 39 shown in cross-section in Figure 9, which has an arcuate protruding head 40 and shoulder portion 42 on the end thereof, so that, when the blank piece of steel subsequently to be formed into the end mill 15, is brought up against the forming tool 39 in a longitudinal direction and held in contact thereto, the arcuate head 42 forms the arcuate depressed portion 22 and the shoulder portion 42 forms and finishes off the peripheral portion surrounding the arcuate depressed portion 22.

The dead center hole 27 used in handling the end mill is formed in the ends of the blank in the usual manner. The spiral fillets and flutes as shown in the illustrations are then formed upon the blank in the usual and conventional way, so that the blank, when fluted, will have the general appearance of the end mill shown in Figure 1 except that the formation of the cutting end is yet to be made.

Figure 11:
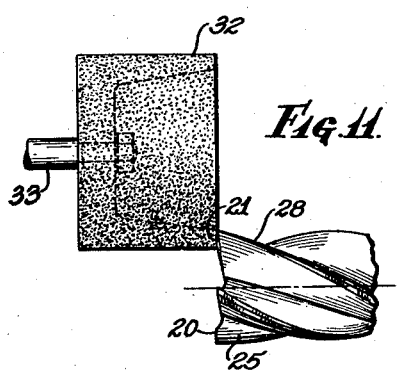
Figure 11 illustrates the method of grinding a cutting clearance at the end of each fillet, and shows a plan view.
Figure 12:
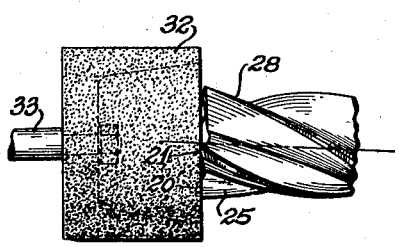
Figure 12 represents a view of the grinder and mill shown in Figure 11 with the grinder and mill rotated 90 degrees, so as to show another view of the method of forming the cutting clearance at the end of each fillet.

The next step in forming the cutting edge of my end mill is illustrated in Figures 11 and 12. The cup grinder 32 mounted upon the shaft 33 is rotated and the cutting end of my end mill is moved laterally to the grinder and brought up into position against the grinder 32. In this step of the process, the cutting clearance 21 is being formed. Figure 11 is a plan view looking down upon the grinder and end mill. The end mill is moved in sidewards toward the grinder until in the position shown in Figure 11. This grinds the cutting clearance 21 upon the end of the fillet, thereby forming the cutting edge 20 at the junction of the cutting clearance and the undercut side 25. Since the cutting clearance extends from the cutting edge at a slight incline, it is necessary to hold the end mill at a slight angle in respect to the shaft of the grinder. In Figure 11, the angle of the cutting clearance 21 is such that the right hand end of the end mill is raised from the plane of the drawing and therefore this slight angle is not shown in Figure 11. In order to show the angle at which the end mill is held in respect to the grinder, I show in Figure 12 a view of the same step of the process shown in Figure 11. However, in Figure 12 the grinder and end mill have been rotated 90 degrees so that the cutting clearance 21 shown near the axial center of the grinder in Figure 12 is the same as the cutting clearance 21 being ground in the view shown in Figure 11. Figure 12 illustrates the angle at which the cutting clearance 21 is ground, by reason of the 90 degree rotation, but in the actual grinding operation, the right hand end of the end mill is tipped upwardly.

Figure 13:
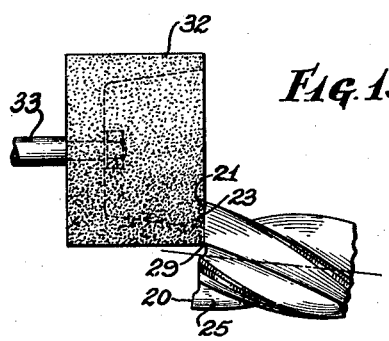
Figure 13 illustrates the method of forming a flute clearance on the end mill and shows a plan view.
Figure 14:
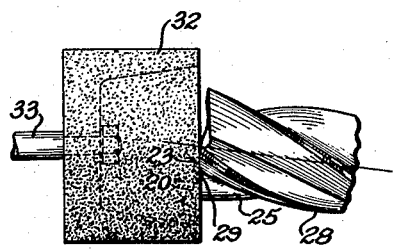
Figure 14 represents a view of the grinder and mill shown in Figure 13 with the grinder and mill rotated at 90 degrees; so as to show another view of the method of forming the flute clearance.

Figures 13 and 14 illustrate the next step of grinding the flute clearance 23 upon the ends of the fillets. Figure 13 is a plan view of the grinder 32 and end mill. The end mill is moved in laterally in respect to the grinder 32 and brought toward the axial center of the grinder to the position shown in Figure 13. The flute clearance 23 extends from the cutting clearance 21 to the point 29, and therefore, the mill is brought in towards the grinder up to where point 29 is ground. The flute clearance 23 is disposed at a compound angle upon the end or each fillet, that is, it is disposed at an incline from the cutting clearance 21 towards the next adjacent flute and also disposed at an incline angle away from the depressed portion toward the wider side of the fillet. The angle showing the said incline from the cutting clearance 21 towards the next adjacent flute can be seen in Figure 13, a plan view which shows the right hand end of the end mill as being held at an angle to the face of the grinder. The right hand end of the end mill is also raised up from the plane of the drawing in Figure 13 in order to give the other angle of the flute clearance. Figure 14, the view showing the same operation as Figure 13, is a view showing the same operation as is shown in Figure 13, and shows the grinder and mill rotated 90 degrees so that the flute clearance 23 shown near the axial center of the grinder, in Figure 14, is the same as the flute clearance 23 as is being ground in Figure 13. The second angle of the compound angle of the flute clearance 23 is shown in Figure 14 and shows the right hand end as inclined downwardly, but in actual grinding operation, the right hand end is tipped upwardly.

In the forming of the end mill, the steps shown in Figures 11, 12, 13, and 14 are repeated for each of the fillets so that a clearance surface is formed upon the end of each of these fillets. The angle between the cutting clearance and flute clearance is very slight and may be so small as to be unnoticeable and in some instances the angle between them may be eliminated so that only one clearance surface appears upon the end of each fillet. In the event that the flute clearance and the cutting clearance are all on one plane, then either the step in Figures 11 and 12 or the step in Figures 13 and 14 is eliminated as there would only be the one grinding step on the end of each fillet. The end mill would similarly be held against the grinder and tipped at the desired angle or angles. It is to be noted that the clearance surface ground upon the end of the fillet is substantially confined to the end thereof so that the wall of the depressed portion 22 at the terminus of each flute valley is not rearwardly cut.

In the cutting of the clearance surface at the end of each fillet burrs may be formed and the arcuate depressed portion may be somewhat roughened. To eliminate such roughness, I provide the additional step of polishing out the depressed portion 22 by means of the emery polisher 41 shown in Figure 15. The polisher 41 rotates upon its longitudinal axis which lies longitudinally to the end mill 15 and by its rotative and abrasive action smooths and polishes the arcuate depressed portion 22 previously formed in the cutting end of the end mill. The completion of this step of the process presents an end mill having a finished cutting end ready for efficient cutting.

Figure 15:
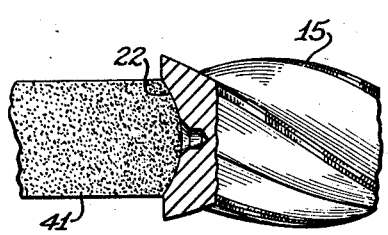
Figure 15 illustrates the method of finishing and polishing the depressed portion after the forming of the clearance surfaces upon the cutting end of the mill.

In order to form an end mill having the depressed portion shown in the modifications of Figures 5, 6, and 7, it is necessary to substitute a forming tool formed to complement the desired modified depressed portion for that shown in Figure 9, and a polisher formed to complement the desired modified depressed portion for that shown in Figure 15. By substituting a forming tool having a head, which complements the depressed portion of the shape desired, the same step of forming the depressed portions is used as described above.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. An end mill capable of cutting at a marked increase in speed as compared with other end mills in standard practice and at the same time maintaining cutting edges comparable with the cutting edges of said other end mills, said end mill comprising a fluted member having a body portion and a plurality of fillets with longitudinal cutting edges extending therealong and forming flutes between said fillets, the valley of the flutes constituting a part of the outer surface of the body portion, a lateral cutting edge on the lateral end face of each of said fillets, each said lateral cutting edge being disposed substantially at right angles to the longitudinal axis of said mill and the outer end of each said lateral cutting edge meeting the longitudinal cutting edge of each said fillet to form a sharp cutting corner, the cutting end of the said end mill being modified from standard practice by having a substantial decrease in the length of the lateral cutting edges and by having a substantial increase in distance between the inner ends of the lateral cutting edges and by having a relatively wide and shallow depressed portion having sloping sides intermediate, and adjacent to, the inner ends of the lateral cutting edges, the depth of said depressed portion being greater towards the axis of said body portion, and being further modified by having the valley of the flutes extended along the body portion to substantially the most forward part of the body portion at the cutting end so that the said valley of each flute affords a surface upon which the severed mass is carried and directed along the flutes away from the cutting end to prevent the severed mass from working inwardly under the cutting end of the end mill.

2. An end mill capable of cutting at a marked increase in speed as compared with other end mills in standard practice and at the same time maintaining cutting edges comparable with the cutting edges of said other end mills, said end mill comprising a fluted member having a body portion and a plurality of fillets with longitudinal cutting edges extending therealong and forming flutes between said fillets, the valley of the flutes constituting a part of the outer surface of the body portion, a lateral cutting edge on the lateral end face of each of said fillets, each said lateral cutting edge being disposed substantially at right angles to the longitudinal axis of said mill and the outer end of each said fillet to form a sharp cutting corner, the cutting end of the said end mill being modified from standard practice by having a substantial decrease in the length of the lateral cutting edges and by having a substantial increase in distance between the inner ends of the lateral cutting edges and by having a relatively wide and shallow depressed portion having sloping sides intermediate the inner ends of the lateral cutting edges, said depressed portion being extended to the inner ends of the said lateral cutting edges, the depth of the depressed portion being greater towards the axis of said body portion, and being further modified by having said depressed portion extending inwardly in a gradual slope from the terminus of the valley of each said flute.

3. An end mill for cutting a mass and having a plurality of cutting edges on a lateral end face of said mill comprising, in combination, a fluted member having a body portion and a plurality of fillets extending along the body portion, each of said fillets having longitudinal sides converging to form a longitudinal cutting edge extending thereon, a lateral cutting edge on the lateral end face of each of said fillets, each said lateral cutting edge being disposed substantially at right angles to the longitudinal axis of said mill and the outer end of each said lateral cutting edge meeting the longitudinal cutting edge of each said fillet to form a substantially sharp cutting corner, said fluted member having a depressed end portion at the end of said body portion intermediate of said lateral cutting edges, said depressed end portion being shallow adjacent the inner ends of the lateral cutting edges and being deeper inwardly toward the longitudinal axis of the end mill, the valley of each flute extending toward the cutting end of the mill to a line defined by a plane intersecting the mill at the terminus of, and lying substantially perpendicular to, one of said longitudinal sides of each said fillet to form a surface for causing the severed mass cut by the mill to be directed along the flutes and for preventing the said severed mass from moving inwardly from said lateral cutting edges under the body portion of the mill.

4. A mill having a cutting end comprising, in combination, a fluted member having a body portion and a plurality of fillets extending along the body portion and forming flutes between said fillets, each of said fillets having a longitudinal cutting edge extending thereon, the valley portion of the flutes constituting a part of the body portion, a lateral cutting edge on the end of each of said fillets at the cutting end of the mill, each said lateral cutting edge being disposed substantially at right angles to the longitudinal axis of said mill and the outer end of each said lateral cutting edge meeting the longitudinal cutting edge of each said fillet to form a substantially sharp cutting corner, said fluted member having a depressed end portion extending across the end of said body portion intermediate of said lateral cutting edges, said depressed end portion being extended outwardly to points lying on the end of the fillets near the inner end of each of said cutting edges and being extended outwardly to points lying on and near the outer edge of the body portion, the clearance surface for each cutting edge being confined to the end of the fillet, and the nearby valley portion of each of the flutes between the said clearance surface and the inner end of the next adjacent cutting edge being extended forwardly to the edge of the said depressed end portion at said points lying on or near the outer edge of the body portion to provide a surface upon which the severed material cut by the mill may ride and then escape along the flutes of the end mill away from the cutting end and thus prevent the severed material from escaping inwardly under the end of the mill.

5. A mill having a cutting end comprising, in combination, a fluted member having a body portion and a plurality of fillets extending along the body portion and forming flutes between said fillets, each of said fillets having a longitudinal cutting edge extending thereon, the valley portion of the flutes constituting a part of the body portion, a lateral cutting edge on the end of each of said fillets at the cutting end of the mill, each said lateral cutting edge being disposed substantially at right angles to the longitudinal axis of said mill and the outer end of each said lateral cutting edge meeting the longitudinal cutting edge of each said fillet to form a substantially sharp cutting corner, said fluted member having a depressed end portion extending across the end of said body portion intermediate of said cutting edges, said depressed end portion being extended outwardly to points lying on the end of the fillets near the inner end of each of said cutting edges and being extended outwardly to points lying on and near the outer edge of the body portion, the clearance surface for each cutting edge being confined to the end of the fillet and defining substantially an arcuate triangle having the base defined by the cutting edge, one side defined by a segmental portion of the edge of the depressed end portion and the other side defined by the outer surface of the fillet, the apex of each of the arcuate triangles being positioned at a circumferential distance from the inner end of the next adjacent cutting edge, and the nearby valley portion of the flute between said apex and the inner end of the next adjacent cutting edge being extended forwardly to the edge of the said depressed end portion to provide a surface upon which the severed material cut by the mill may ride and then escape along in the flutes of the end mill away from the cutting end and thus prevent the severed material from escaping inwardly under the end of the mill.

6. An end mill for cutting a mass and having a plurality of cutting edges on a lateral end face of said mill comprising, in combination, a fluted member having a body portion and a plurality of fillets extending along the body portion, each of said fillets having longitudinal sides converging to form a longitudinal cutting edge extending thereon, a lateral cutting edge on the lateral end face of each of said fillets, each said lateral edge being disposed substantially at right angles to the longitudinal axis of said mill and the outer end of each said lateral cutting edge meeting the longitudinal cutting edge of each said fillet to form a substantially sharp cutting corner, said body portion having a gradually sloping depressed portion on its cutting end intermediate the inner ends of said lateral cutting edges, said depressed portion extending inwardly and gradually rearwardly from the terminus of the valley of each of the flutes and from the inner ends of the lateral cutting edges, the valley of each flute extending toward the cutting end of the mill to a line defined by a plane intersecting the mill at the terminus of, and lying substantially perpendicular to, one of said longitudinal sides of each said fillet to form a valley surface for causing the severed mass cut by the mill to be directed along the flutes and for preventing the said severed mass from moving inwardly from said lateral cutting edges under the body portion of the mill.

CARL G. GASE.